United States Patent [19]

Daniels, deceased et al.

[11] 4,290,160

[45] Sep. 22, 1981

[54] ROTARY BRUSH

[76] Inventors: Larry K. Daniels, deceased, late of Flagstaff, Ariz.; Patricia K. Daniels, administratrix, Flagstaff, Ariz.

[21] Appl. No.: 113,634

[22] Filed: Jan. 21, 1980

[51] Int. Cl.³ .............................................. A46B 13/06
[52] U.S. Cl. ........................................................ 15/29
[58] Field of Search ............... 15/24, 29, 97 R, 23, 15/28, 50 R; 51/170 T, 177

[56] References Cited

U.S. PATENT DOCUMENTS

| | | | |
|---|---|---|---|
| 99,814 | 2/1870 | Barth | 15/29 |
| 1,694,733 | 12/1928 | Cummins | 15/29 |
| 2,918,686 | 12/1959 | Swearngin | 15/29 |

FOREIGN PATENT DOCUMENTS

| | | | |
|---|---|---|---|
| 1944867 | 11/1971 | Fed. Rep. of Germany | 15/29 |
| 580298 | 7/1958 | Italy | 15/29 |

Primary Examiner—Edward L. Roberts
Attorney, Agent, or Firm—Don J. Flickinger

[57] ABSTRACT

A rotor assembly, including a circular spatter shield carrying a cylindrical brush element, is rotatably carried proximate one end of a hollow handle, the other end of which is connectable to a source of pressurized fluid. Delivery tubes extending from the handle direct the liquid against a row of inwardly directed impeller blades carried by the shield to force rotation of the rotor assembly. A fluid impervious flexible skirt coaxially encircles the brush element. A second brush element is stationarily secured to the handle coaxially within the rotor actuated brush element.

10 Claims, 4 Drawing Figures

U.S. Patent  Sep. 22, 1981  4,290,160
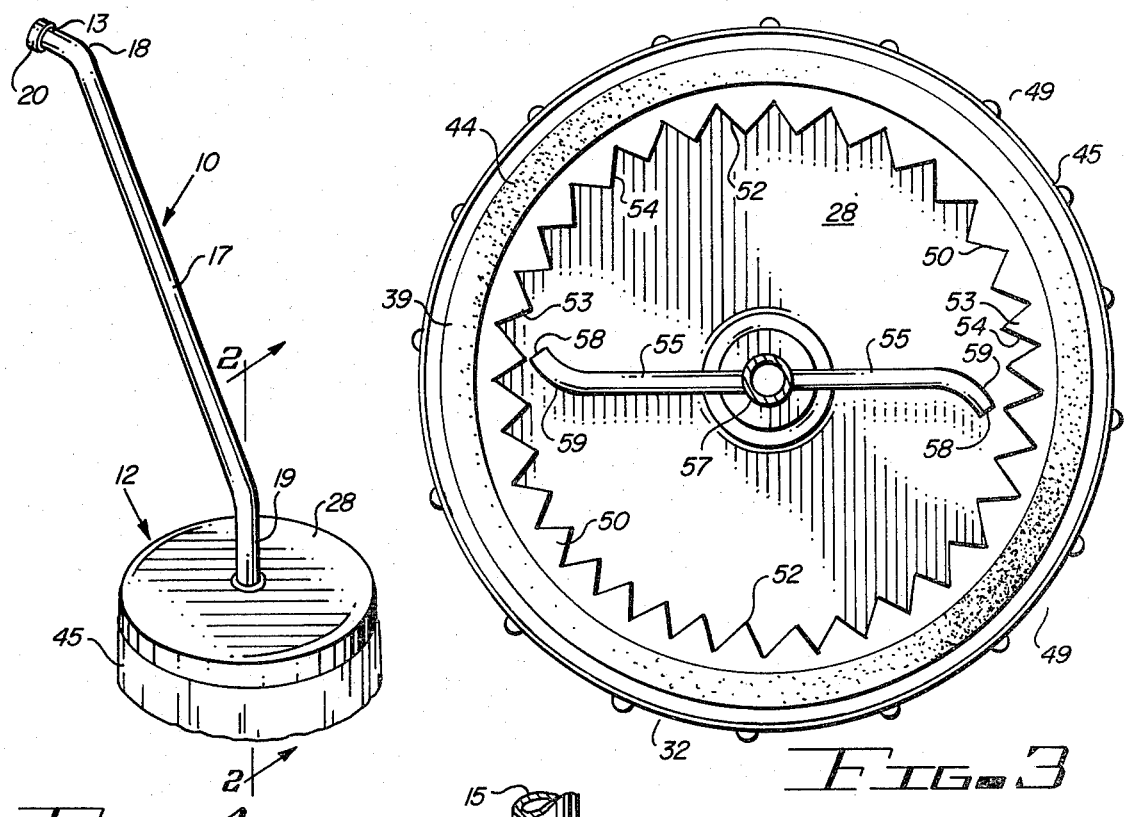
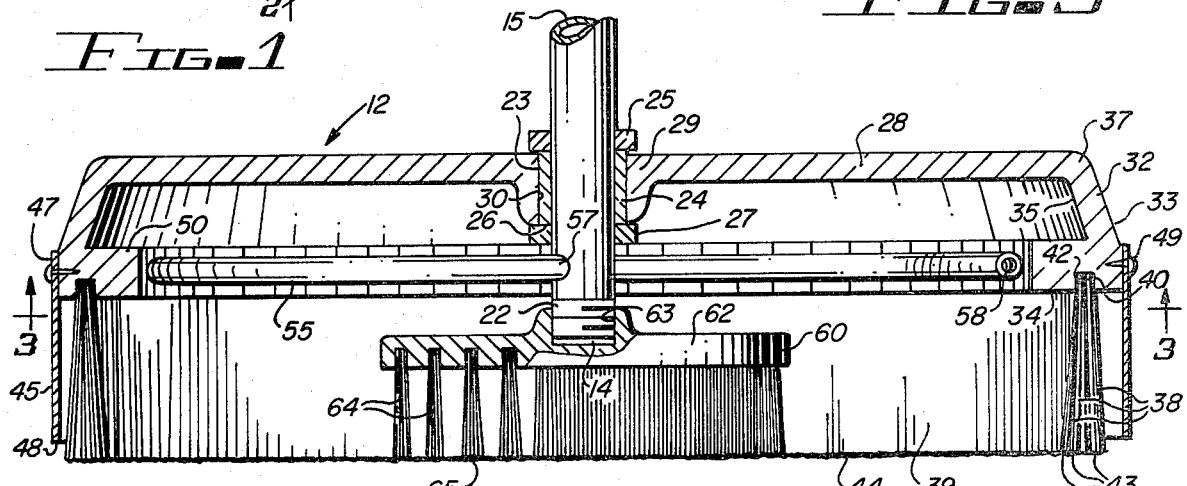
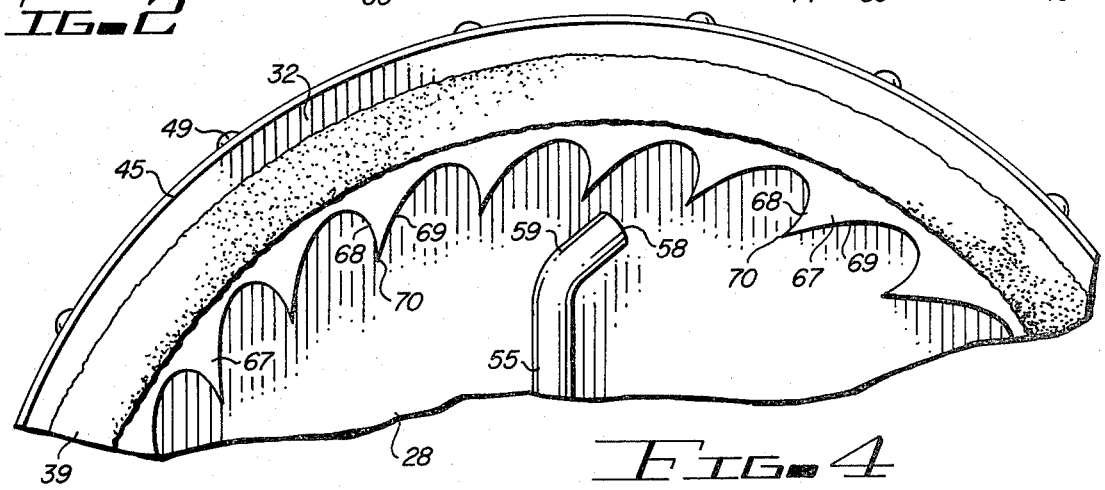

ROTARY BRUSH

This invention relates to cleaning and scrubbing devices.

In a further aspect, the present invention relates to apparatus for concurrently wetting and brushing a selected surface.

More particularly, the instant invention concerns a rotary brush in which the wetting agent causes rotary movement of the brushing element.

The prior art is replete with various apparatus for concurrently performing the companion cleansing operations of wetting and brushing. Commonly, such devices include an elongate hollow handle which is adapted at one end to be attached to a source of pressurized fluid, such as water. At the other end of the handle is a brush caused to rotate in response to the pressurized fluid. Expended fluid is the wetting agent.

Among the uses for such devices is the cleansing of selected surfaces including motor homes, mobile homes and buildings. Domestically, rotary brushes are usually attached to a conventional garden hose to receive water under ordinary utility line pressure. Commercially, the pressurized water may be supplied by a pump through a special hose. In either case, soap or other preparations may be introduced into the water to provide special purpose liquid solutions.

A search of records within the United States Patent and Trademark Office was conducted to determine prior art relevant to the instant subject. Disclosed were the following issued U.S. Pat. Nos.

| | |
|---|---|
| 99,814 Barth | 1,694,733 Cummins |
| 634,813 Gans | 4,151,624 Montalvo |
| 2,918,686 Swearngin | 1,055,572 Thompson |

Also discovered were German Pat. Nos. 1,068,214 and 1,944,867.

Barth, U.S. Pat. No. 99,814, discloses an elongate tubular handle having an angularly mounted rotatable brushing head having a plurality of passages extending therethrough. Jet action of the water exiting from the passages urges rotation of the head. The plurality of veins carried by a cup-like shield receives the exiting water thereagainst to increase the rotational force.

Cummins, U.S. Pat. No. 1,694,733, discloses a brush head rotatably carried by a stationary plate affixed to one end of a pipe. A plurality of impeller blades are carried at the upper end of the brush head. Within the housing is circular chamber for receiving water from the pipe and having a plurality of tangentially arranged orifices for delivering the water to the blades.

Gans, U.S. Pat. No. 634,813, discloses a circular scrub brush rotatably carried by a stationary housing. An external row of plates encircle the upper portion of the brush and receive pressurized fluid, water or air, from a nozzle affixed to the handle.

Montalvo, U.S. Pat. No. 4,151,624, discloses a rotary brush mechanism including a flywheel and a drive gear. A plurality of water passages extend through the flywheel and terminate with angularly disposed nozzles. Water from the nozzles is impinged upon a plurality of blades to further urge rotation of the flywheel.

Swearngin, U.S. Pat. No. 2,918,686, discloses a stationary head affixed to the end of a hollow handle. A rotor, including a disk provided with bristles, is rotatably affixed to the head. The jet action of water exiting from passages within the disk urges rotation of the head. A plurality of stationary bristles carried by the head coaxially encircle the rotor.

Thompson, U.S. Pat. No. 1,055,572, discloses a circular brush rotatably carried by a stationary housing in which a chamber is formed within the upper portion of the housing. A turbine residing with the chamber is drivingly engaged with the circular brush. An admission port or nozzle at the end of the hollow handle delivers water to the chamber.

The German references were not translated.

A primary utility of devices of the instant type, also referred to as fountain brushes, arises from the dual cleansing functions which greatly facilitate the convenience of users. The concurrent application of a liquid, water or special solution, to a surface and the brushing of said surface eliminate the need for plural cleaning paraphernalia as required to perform each task independently. The liquid is delivered to the exact area being brushed. Due to the length of the handle, the surface area available to the user is extended without need for still other paraphernalia, such as step ladders. Also both hands of the user can be used to manipulate a single item.

The prior art, however, has not provided an entirely satisfactory solution for those having need of devices of the instant type. Some of the devices are exceedingly heavy while others are relatively complex and expensive to manufacture. Also, overlooked by the prior art is a device capable of quick cleansing over broad areas and still providing for heavy duty scrubbing within selected localized areas. Further, there is a tendency among the devices for the water to be spattered and readily thrown from the area being cleansed.

It would be highly advantageous therefore to remedy the deficiencies associated with the prior art.

Accordingly, it is an object of the present invention to provide an improved fountain or rotary brush.

Another object of the invention is the provision of a rotary brush which is detachably securable to a conventional garden hose or other source of pressurized fluid.

Still another object of the invention is to provide a rotary brush in which pressurized fluid causes rotation of the brush and expended fluid wets the area to be cleansed.

And still another object of this invention is the provision of a liquid driven rotary brush device having improved means for causing rotation of the brush.

Yet another object of the invention is to provide a rotary brush having means for retarding flow of the liquid away from the area being brushed.

Yet still another object of the invention is the provision of a rotary brush having an integral spatter shield.

A further object of the instant invention is to provide a rotary brush having an improved rotating brush element for readily cleansing relatively large areas.

And a further object of the invention is the provision of a rotary brush device further including an auxillary brush element especially adapted for strenuous scrubbing of localized areas.

Still a further object of the invention is to provide a rotary brush device having approved rotatable connection means between the handle and rotating brush.

And still a further object of the invention is the provision of a device of the above character which is relatively light in weight and comparatively simple and inexpensive to manufacture, yet is exceedingly efficient and durably constructed.

Briefly, to achieve the desired objects of the instant invention in accordance with a preferred embodiment thereof, first provided is an elongate handle member having an inlet end, a discharge end and a fluid passage communicating between said ends. Connection means carried at the inlet end of the handle are adapted for connection to a source of pressurized fluid. A rotor assembly including a generally circular spatter shield and a generally cylindrical brush element is rotatably secured proximate the discharge end. Nozzle means communicating with the fluid passage impinge the pressurized fluid upon a circumferential row of spaced apart inwardly directed impeller blades. A skirt coaxially encircles the brush element.

In accordance with a further embodiment of the invention, the nozzle means includes a pair of diametrically opposed delivery tubes extending from the handle. Each tube has an angled terminal portion for directing pressurized liquid to the liquid receiving face of each impeller blade. The impeller blades, the brush element and the skirt are carried by a peripheral flange extending downwardly from the spatter shield.

In yet a further embodiment of the invention, a stationary brush element is affixed to the discharge end of the handle coaxial with the brush element carried by the rotor assembly.

The foregoing and further and more specific objects and advantages of the instant invention will become readily apparent to those skilled in the art from the following detailed description of preferred embodiments thereof taken in conjunction with the drawings, in which:

FIG. 1 is a perspective view of a rotary brush constructed in accordance with the teachings of the instant invention;

FIG. 2 is an enlarged fragmentary vertical sectional view taken along the line 2—2 of FIG. 1;

FIG. 3 is a horizontal sectional view taken along the line 3—3 of FIG. 2; and

FIG. 4 is a view generally corresponding to a fragmentary portion of the illustration of FIG. 3 and showing an alternately preferred embodiment thereof.

During now to the drawings in which like reference numerals indicate corresponding elements throughout the several views, attention is first directed to FIG. 1 which shows a rotary brush emboding the principles of the instant invention having an elongate handle member and a rotary assembly generally designated by the reference characters 10 and 12, respectively. Handle member 10, as further viewed in FIG. 2, includes an inlet end 13, a discharge end 14, and a fluid passage 15 therethrough.

To provide a lightweight noncorrosive structure, it is suggested that handle member 10 be fabricated of aluminum too. However, other materials such as various metals and plastics are suitable. For convenience of the user, handle member 10 includes elongate intermediate section 17, angled first section 18 adjacent inlet end 13 and angled second section 19 adjacent discharge end 14. Connection means specifically illustrated in the form of conventional hose connection 20 is carried at inlet end 13 and a male threaded section 22 is adjacent discharge end 14. Elongate intermediate section 17 provides a hand grip for the user and extends the reach of the user. Angled second section 19 positions rotor assembly 12 at a favorable angle for use relative intermediate section 17 while angled first section 18 tends to direct the hose away from the body of the user. Hose connection 20 was chosen for purposes of illustration as a connection means since the conventional garden hose is a common source of domestic pressurized fluid. For industrial application, wherein the fluid is supplied by special pumps or other apparatus, other appropriate commercially available connection means will readily occur to those skilled in the art.

Bushing 23 having outer bearing surface 24, shoulder 25 and end 26 spaced from shoulder 25 is press-fitted or otherwise secured to handle member 10 near discharge end 14. Preferably fabricated of teflon or other antifriction material, bushing 23 provides mounting means for rotatably securing rotor assembly 12 to handle member 10. Retention means, in the form of ring 27 abuting end 26 and adhesively secured thereto or press-fitted onto handle member 10, retains rotor assembly 12 in assembly with handle member 10.

Generally circular spatter shield 28, which may be fabricated of metal, plastic or other suitable material, includes an integral hub 29 having bore 30 therethrough which is rotatably journaled upon bearing surface 24 of bushing 23. Flange 32 having exterior surface 33, under surface 34 and inner surface 35 is directed downwardly from the peripheral edge 37 of spatter shield 28.

A plurality of bristles are held by flange 32 in an arrangement to form generally cylindrical brush element 39. In accordance with generally conventional technique, the several bristles 38 include a fixed end 40 which is crimped within circular groove 42 extending into flange 32 from under surface 34. Free ends 43 of the bristles 38 form scrubbing face 44 of brush element 39. Scrubbing face 44 is generally parallel to spatter shield 28 and perpendicular to the axis of rotation of rotor assembly 12 about handle member 10. For purposes of reference and differentiation from a brush element to be subsequently described, brush element 39 is considered the movable brush element.

Skirt 45 having upper edge 47 and lower edge 48 coaxially encircles brush element 39 and is secured to the outer surface 33 of flange 32 proximate the upper edge thereof by fastening elements 49. Preferably, skirt 45 is fabricated of a thin flexible, fluid impervious, material such as rubberized cloth, neoprene or soft plastic. Fastening elements 49 may be in the form of drive screws, rivets or other fasteners suitable for use in connection with the material of construction of spatter shield 28. While skirt 45 may be of any desired length, it is preferred that lower edge 48 is spaced slightly above scrubbing face 44 for reasons which will be described presently.

As further viewed in FIG. 3, a circumferential row of spaced apart impeller blades 51 are carried by flange 32. Each impeller blade 51 projects from inner surface 35 to an inwardly directed apex 52 and includes a liquid receiving face 53 and a rear face 54. In the immediate embodiment each impeller blade 51 is generally triangular in cross-section.

Tubes 55 having inlet and discharge ends 57 and 58, respectively, extending in diametrically opposed directions from handle member 10 proximate discharge end 14, communicate with fluid passage 15 and function as nozzles for delivering pressurized fluid to the circumferential row of impeller blade 51. Each tube 55 includes a terminal portion 59 which is angled for the purpose of impinging the fluid at a generally normal angle to the water receiving face 53 of each impeller blade 51.

Stationary brush element 60 includes base plate 62 having threaded aperture 63 which is matingly engagable with male threaded section 22 of handle member 10. A plurality of bristles 64 are secured at one end thereof to base plate 62 in accordance with conventional brush making technique. The free ends of the bristles define a scrubbing face 65 which is substantially in the plane of scrubbing face 44.

FIG. 4 illustrates an embodiment of the invention having alternately preferred impeller blades 67. In general similarity to the previously described impeller blades 50, the instant blades 67 are generally triangular in cross-section and include liquid receiving face 68, rear face 69 and inwardly directed apex 70. The rear face 69 of each blade 67 is blended into the liquid receiving face 68 of the adjacent blade 67 along a continuous surface in the form of a concave generally involute curve. The concave curved surface forms a pocket for receiving the pressurized fluid from discharge end 58 of tube 55 and extracting maximum energy therefrom.

Various methods will readily occur to those skilled in the art for forming impeller blades 51 and 67. As a manufacturing convenience, the formation of the impeller blades may be consistent with the material chosen for fabrication of spatter shield 28. For example, if spatter shield 28 is fabricated of relatively thin sheet metal the impeller blades may be impressed into flange 32 with corresponding deformation of outer surface 33. When spatter shield 28 is fabricated of a plastic, the impeller blades may be enmolded integrally therewith. It is also within the teachings of the instant invention that the impeller blades may be carried by a separately fabricated ring which is subsequently fastened to flange 32.

Operation of the device of the instant invention from a mechanical standpoint and from a user standpoint is relatively simple. Initially, connection means 20 is affixed to a selected source of pressurized liquid. For domestic use, the source of pressurized liquid may be a conventional garden hose which delivers water at normal line pressure. A dispenser of soap or other selected chemicals of a commercially available type may be connected in series between the garden hose and handle member 10. For commercial application, the pressurized liquid may be in the form of plain water or special cleansing solutions which may be supplied by pump from a tank in which the solution is mixed and held.

The pressurized liquid passing through passage 15 and tubes 55 is forceably ejected from discharge ends 58 to be impinged upon the liquid receiving faces, 53 or 67, of the respective impeller blades 51 or 67. Accordingly, rotor assembly 12 including spatter shield 28, brush 39 and skirt 45 are caused to rotate. Placement of scrubbing face 44 against a selected surface quickly and conveniently cleanses relatively large areas thereof. The rotary movement of the assembly tends to throw the cleansing liquid away from the area under treatment. Skirt 45 retards dispersal of the liquid away from the area being cleansed.

Brush element 60 being relatively small in comparison to brush element 39 and being directly at the end of handle member 10 is capable of receiving and transmitting additional force exerted by the user for localized heavy duty scrubbing. Stationary brush 60 is quickly and conveniently removed when not desired by the user.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the present invention and alternately preferred embodiments thereof in such clear and concise terms as to enable those skilled in the art to understand and practice the same, the invention claimed is:

1. A rotary brush for use with a source of pressurized fluid and for utilizing said fluid for wetting and scrubbing a surface, said rotary brush comprising:
 a. an elongate handle member including
  i. an inlet end,
  ii. a discharge end, and
  iii. a fluid passage communicating between said ends;
 b. connection means carried at the inlet end of said handle means for connection to said source of pressurized fluid;
 c. a rotor assembly including
  i. a generally circular spatter shield extending radially from said handle member,
  ii. a generally cylindrical movable brush element terminating with a scrubbing face generally parallel to said shield,
  iii. a skirt coaxially encircling said movable brush element and having a terminal edge proximate said scrubbing face, and
  iv. a circumferential row of spaced apart inwardly directed impeller blades;
 d. nozzle means communicating with said fluid passage for impinging said pressurized upon said impeller blades to urge rotation of said rotor assembly;
 e. mounting means for rotatably securing said rotor assembly proximate the discharge end of said handle member.

2. The rotary brush of claim 1, wherein said mounting means includes:
 a. a bushing encircling said handle member proximate the discharge end thereof and including,
  i. an end having an outwardly directed shoulder, and
  ii. another end spaced from said an end;
 b. a centrally located hub carried by said spatter shield and rotatably journaled upon said bushing; and
 c. retention means opposing said shoulder for retaining said shield upon said bushing.

3. The rotary brush of claim 1, wherein each of said impeller blades are generally triangular in cross-section and include:
 i. an inwardly directed apex,
 ii. a liquid receiving face, and
 iii. a rear face.

4. The rotary brush of claim 3, wherein the liquid receiving face of one of said impeller blades and the rear face of an adjacent one of said impeller blades are joined along a continuous surface in the form of a concave general involute curve.

5. The rotary brush of claim 3, wherein said nozzle means includes a pair of diametrically opposed delivery tubes extending from said handle means, each of said tubes having an angled terminal portion for directing said pressurized liquid to the liquid receiving face of each of said impeller blades.

6. The rotary brush of claim 1, wherein said spatter shield includes a downwardly directed peripheral flange having said movable brush element and said skirt depending therefrom.

7. The rotary brush of claim 6, wherein said impeller blades are carried by said peripheral flange.

8. The rotary brush of claim 1, wherein is said skirt is flexible and fluid impervious.

9. The rotary brush of claim 1, further including a stationary brush element affixed to the discharge end of handle means coaxial with said movable brush element and having a scrubbing face lying generally in the plane of the scrubbing face of said movable brush element.

10. The rotary brush element of claim 9, wherein said stationary brush element is detachably affixed to said handle element.

* * * * *